: USOO6131130A

United States Patent [19]
Van Ryzin

[11] Patent Number: 6,131,130
[45] Date of Patent: Oct. 10, 2000

[54] SYSTEM FOR CONVERGENCE OF A PERSONAL COMPUTER WITH WIRELESS AUDIO/VIDEO DEVICES WHEREIN THE AUDIO/VIDEO DEVICES ARE REMOTELY CONTROLLED BY A WIRELESS PERIPHERAL

[75] Inventor: John M. Van Ryzin, Madison, N.J.

[73] Assignees: Sony Corporation, Tokyo, Japan; Sony Electronics, Inc., Park Ridge, N.J.

[21] Appl. No.: 08/988,229

[22] Filed: Dec. 10, 1997

[51] Int. Cl.[7] ........................................ G06F 13/14
[52] U.S. Cl. .................... 710/6; 345/2; 345/158; 345/327; 340/825.52; 375/295
[58] Field of Search ................. 710/6; 375/295; 345/2, 158, 327; 340/825.52

[56] References Cited

U.S. PATENT DOCUMENTS

| 4,837,812 | 6/1989 | Takahashi et al. ................. 379/98 |
| 5,652,766 | 7/1997 | Matsumura et al. ................ 375/295 |
| 5,668,566 | 9/1997 | Yen ............................................ 345/2 |
| 5,790,201 | 8/1998 | Antos ..................................... 348/552 |
| 5,854,621 | 12/1998 | Junod et al. ......................... 345/158 |
| 5,864,300 | 1/1999 | Cho et al. ......................... 340/825.52 |
| 5,880,721 | 3/1999 | Yen ...................................... 345/327 |

*Primary Examiner*—Thomas C. Lee
*Assistant Examiner*—Abdelmoniem Elamin
*Attorney, Agent, or Firm*—Frommer Lawrence & Haug, LLP; William S. Frommer; Dexter T. Chang

[57] ABSTRACT

A converged system architecture and method for converging a personal computer with audio/video devices is provided. Wireless communications are transmitted between the personal computer and the audio/video devices. Wireless commands for controlling the audio/video devices are entered remotely at a wireless peripheral and coupled to the personal computer. The personal computer generates signals and the wireless communications are coupled to the audio/video devices in accordance with these signals.

24 Claims, 9 Drawing Sheets

WIRELESS SPEAKERS/HEADPHONES

WIRELESS VIDEO MONITOR

WIRELESS KEYBOARD
AND MOUSE TOUCHPAD

12
WIRELESS SPEAKERS/HEADPHONES

10
WIRELESS VIDEO MONITOR

8
WIRELESS KEYBOARD AND MOUSE TOUCHPAD

14
PC BOARD

4
KEYBOARD/MOUSE

OPTIONAL OUTPUT TO CONVENTIONAL TV, AMP, AND SPEAKERS

CABLE/DSS
PHONE
CAMCORDER/ STILL CAMERA

2 2a
CONTROL AUDIO/VIDEO
6
AUDIO/VIDEO
DVD/CD/CDROM JUKE BOX

WIRELESS COMPUTER

SYSTEM FOR CONVERGENCE OF A PERSONAL COMPUTER WITH WIRELESS AUDIO/VIDEO DEVICES WHEREIN THE AUDIO/VIDEO DEVICES ARE REMOTELY CONTROLLED BY A WIRELESS PERIPHERAL

BACKGROUND OF THE INVENTION

1. Field of the Present Invention

The present invention relates to a system architecture for the convergence of computers and home audio/video electronics and, more particularly, to a system architecture which converges a personal computer and wireless home audio/video electronics.

2. Description of the Related Art

Personal computers (PCs) are now capable of performing many tasks once performed only by contemporary audio/video (A/V) devices. Many PCs, for example, now play back music from a CD loaded in a carousel DVD player, edit and play back audio captured by a microphone, and answer/dial telephone calls on a telephone line. More recently, PCs have been equipped with desktop video cameras which capture video for playback to the PC monitor.

It would be advantageous to converge (i.e., integrate) the PC with such home audio/video devices, but this would require that the entire house be hardwired which is both tedious work and expensive to implement. The homeowner might consider installing a network, but the software and hardware needed to support such a network is too costly. In addition, once the particular audio/video device is hardwired to a local area, it becomes difficult to move that device to another location.

Most homeowners who are faced with these drawbacks simply do without a converged system. These homeowners inevitably purchase additional A/V devices for local connection to their PCs which ironically costs them more in the long run. Further, homeowners without converged systems are plagued by a multiplicity of A/V remote control units (remotes) which are frustrating to distinguish and equally annoying to operate with success. To compound the problem, the proliferation of audio/video devices will almost certainly increase.

Homeowners will find it increasingly difficult in the future to operate a household without a converged system. As internet TVs gain in popularity due in part to high definition television (HDTV), it is foreseeable that homeowners will access the internet to accomplish household activities ranging from paying the bills electronically to cooking a recipe by following an internet video feed. Since it would be too constraining to repeatedly access the local area of the PC for all household activities, it would be advantageous if the homeowner were somehow able to access the internet from anywhere in the home.

Heretofore, there has been no practical converged system which is both easy and economical to install, allows the audio/video devices to be freely moved, and provides a common interface through which the homeowner operates the audio/video devices from anywhere in the home.

OBJECTS AND SUMMARY OF THE INVENTION

It is an object of the present invention to provide a system architecture which converges the personal computer and wireless home A/V electronics;

It is another object of the present invention to provide a converged system which is both easy and economical to install;

It is still another object of the present invention to provide a converged system which allows the A/V devices to be freely moved; and It is yet another object of the present invention to provide a converged system having a common interface through which the homeowner operates the A/V devices from anywhere in the home.

According to the present invention, a converged system architecture for converging a personal computer with audio/video devices is provided. Wireless communication means transmits, via a wireless medium, wireless communications between the personal computer and the audio/video devices. Wireless peripheral means enters, remotely from the personal computer, wireless commands for controlling the audio/video devices. The wireless commands are communicated by the wireless communication means from the wireless peripheral means to the personal computer which generates signals for controlling the audio/video devices in accordance with the wireless commands. Coupling means couples, in accordance with the signals, the wireless communications to the wireless communication means for wireless transmission to the audio/video devices.

A method for converging a personal computer with audio/video devices according to the present invention comprises providing a wireless peripheral where wireless commands for controlling the audio/video devices are entered remotely; transmitting, via a wireless medium, the wireless commands to the personal computer; generating signals in the personal computer corresponding to the wireless commands; and controlling the audio/video devices in accordance with the signals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

Figure 1:
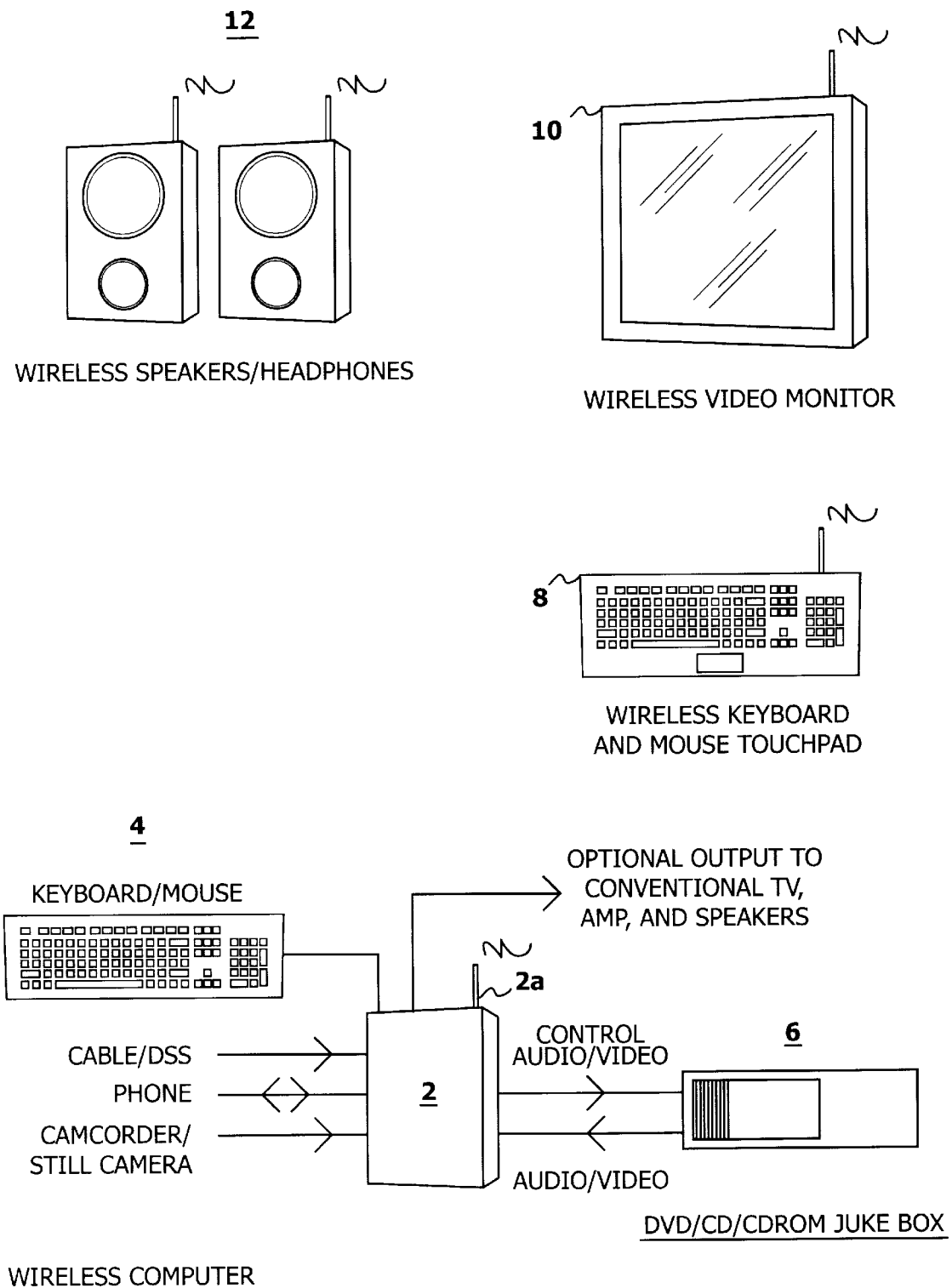
FIG. 1 illustrates the converged system of the present invention.

FIG. 1 shows the converged system according to the present invention wherein wireless computer 2 is physically coupled to keyboard mouse 4, DVD-carousel/CD-player/CD-ROM jukebox 6, cable/DSS, a telephone line and a camcorder/still camera input. The wireless computer is optionally connected to a TV, audio amplifier or speakers.

Of course, the present invention is not limited to such an arrangement of peripherals but may include an am/fm/TV tuner, an internet modem and a phone answering machine, for example. A hard drive, as another alternative, may be provided which temporarily records information from the audio/video devices such as movies, music and telephonic speech.

Keyboard/mouse 4 receives user commands from the user and couples the same, via a physical connection, to wireless computer 2. The DVD-carousel/CD-player/CD-ROM jukebox reproduces movies, music and CD-ROM programs, records audio/video and provides human interface CD-ROM software which controls the manner in which the audio/video is presented to the user. The cable/DSS provides audio/video programs while the telephone line provides connection to a telephone line and the camcorder/still camera input provides camcorder and stillcorder audio/video.

Human interface software reproduced from, for example, CD-ROM by DVD-carousel/CD-player/CD-ROM jukebox 6 controls the manner in which the audio/video information is presented to the user. Such software may also be downloaded from the internet. The software may be processed by wireless computer 2 or sent directly to wireless keyboard/mouse touchpad 8 for processing by an on-board processor (not shown).

In the present invention, wireless peripherals including wireless keyboard/mouse touchpad 8, wireless video monitor 10 and wireless speakers/headphones 12 are also provided which communicate with wireless computer 2 via antenna 2a. The wireless signals are preferably RF signals or any such signals which are capable of passing through walls in the home such that the user may operate the audio/video devices from anywhere in the home.

Wireless speakers/headphones 12 reproduce CD music, radio/TV and computer audio. Wireless video monitor 10 displays TV programs, DVD movies, internet video feeds and CD multimedia. Wireless keyboard/mouse touchpad 8 transmits wireless commands to both wireless television 10 where the commands are displayed for visual confirmation and to wireless computer 2 which controls the audio/video devices accordingly.

Other arrangements of wireless peripherals are also within the scope of the present invention. The mouse touchpad of the wireless keyboard, for example, may be replaced with a standard mouse or the wireless video monitor may be replaced with a wireless palmtop.

In operation, the user physically connects wireless computer 2 to the wired audio/video devices and operates the same locally using keyboard/mouse 4 or, from anywhere in the home, using wireless keyboard/mouse touchpad 8. The user positions the wireless audio/video devices anywhere in the home and operates them locally or remotely in the same manner.

More particularly, the commands entered locally at keyboard/mouse 4 are physically coupled to an input of wireless computer 2 which controls the audio/video devices accordingly and displays the commands on a local monitor (not shown). Meanwhile, the wireless commands entered at wireless keyboard/mouse touchpad 8 are transmitted to both the wireless computer which controls the audio/video devices in accordance with the wireless commands and to the wireless video monitor which displays the commands for visual confirmation by the user.

Figure 2:
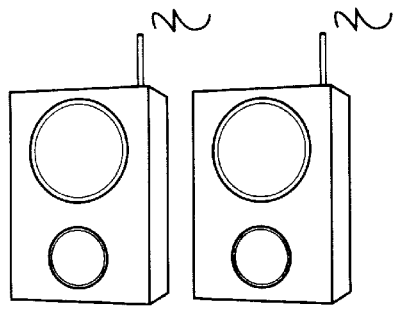
FIG. 2 illustrates the converged system according to a first embodiment of the present invention.
Figure 2:
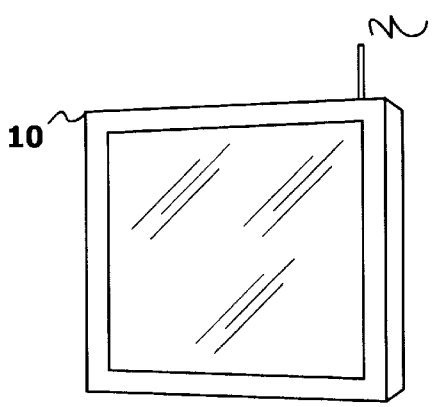
Figure 2:
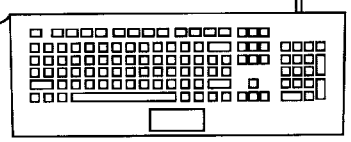
Figure 2:
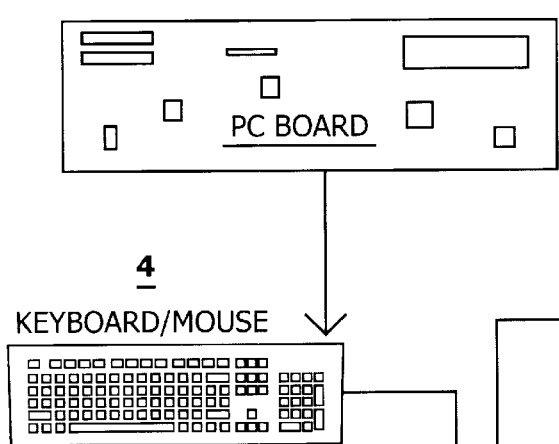
Figure 2:
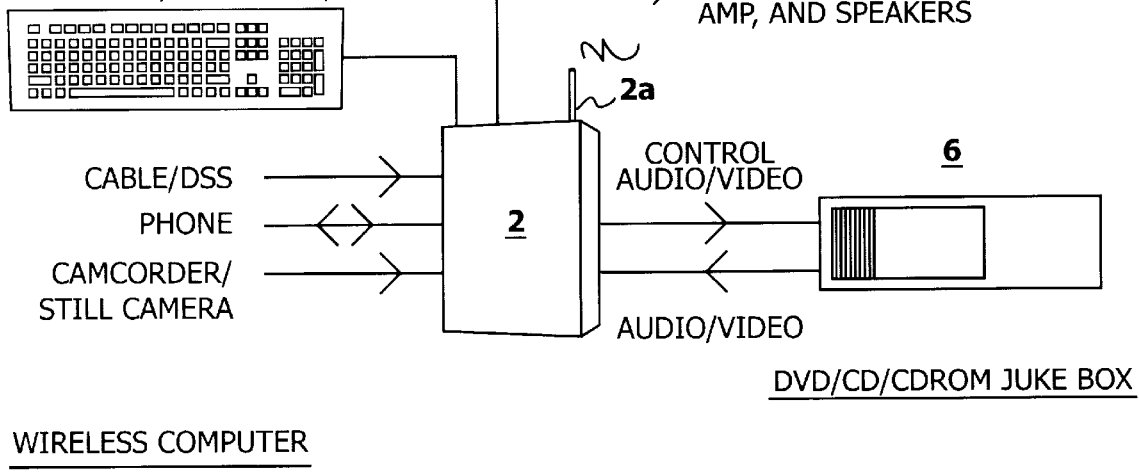

The first embodiment of the present invention shown in FIG. 2 provides PC board 14 which switches wireless computer 2 between wired and wireless communications. More particularly, PC board 14 couples wireless commands from wireless keyboard/mouse touchpad 8 to a keyboard input of the operating system (O/S) when commands are entered remotely at the wireless keyboard and to a mouse input of the operating system when wireless mouse commands are entered. On the other hand, wired commands entered locally at wired keyboard/mouse 4 are directed by PC board 14 to the operating system inputs in the same manner.

Figure 3:
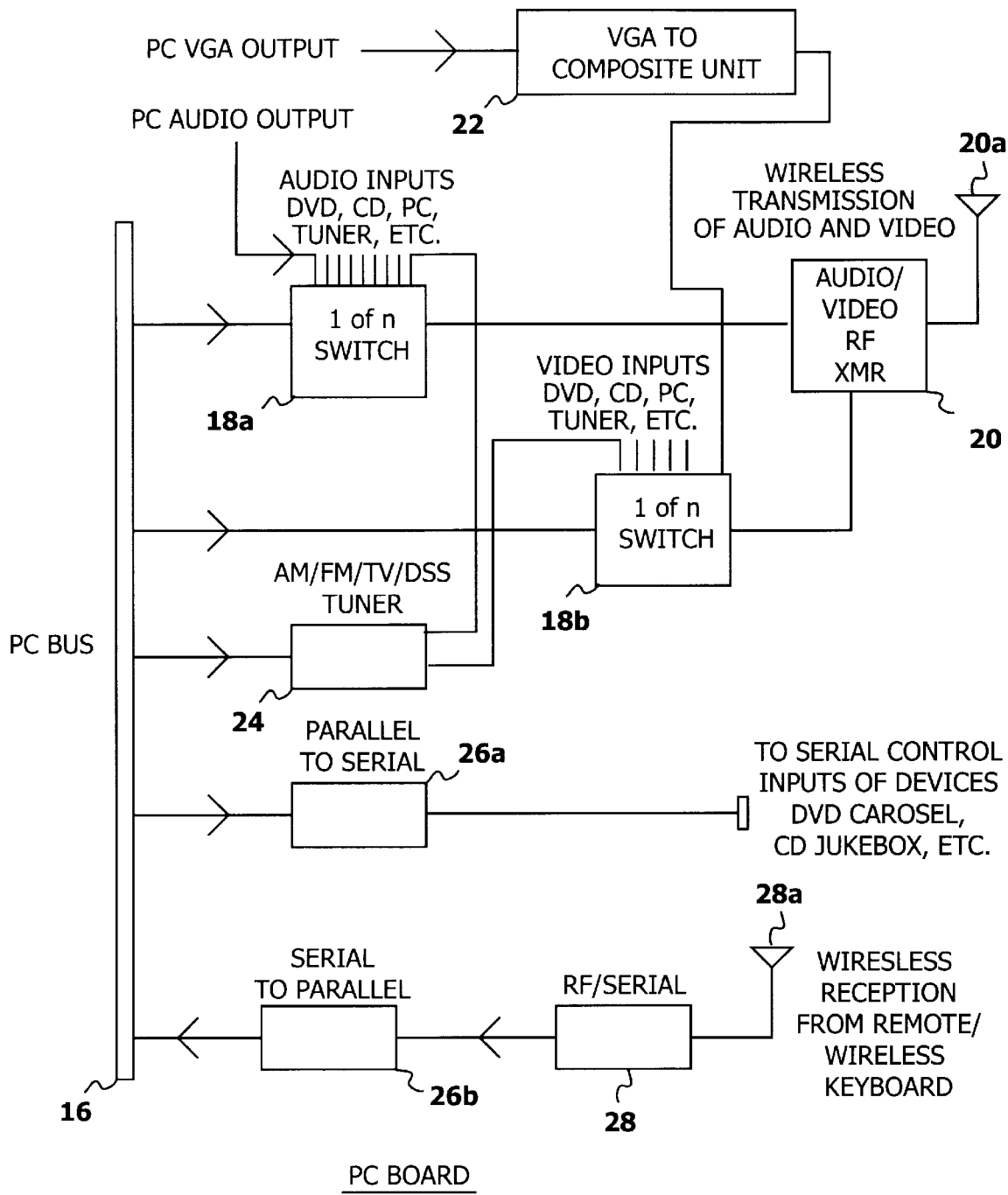
FIG. 3 is a detailed illustration of the first embodiment shown in FIG. 2 of the present invention.

FIG. 3 shows a more detailed illustration of PC board 14 wherein wireless computer 2 is coupled to PC board 14 through PC bus 16. The audio/video received from the physically-connected audio/video devices is coupled to 1 of n terminals of switches 18a and 18b. Optionally, and as shown in FIG. 3, am/fm/TV/DSS signals which are received by tuner 24 are also coupled to the terminals of switches 18a and 18b. As another option, a PC VGA signal from the VGA card of wireless computer 2 is converted to a composite signal by VGA/composite unit 22 and coupled to a terminal of switch 18b.

Switches 18a and 18b are switched by switching signals sent from wireless computer 2 through PC bus 16 in accordance with the commands received from keyboard/mouse 4 or wireless keyboard/mouse touchpad 8. When the user commands wireless computer 2 to send CD audio to wireless speakers 12, for example, the wireless computer causes switch 18a to select the CD input and, as a result, CD audio signals are coupled to audio/video RF transmitter 20 which converts the CD audio signals into RF. Whereupon, the CD audio signals are transmitted to wireless speakers 12 by antenna 20a.

Commands entered locally at keyboard/mouse 4 or remotely at wireless keyboard/mouse touchpad 8 are bussed by PC bus 16 to parallel-to-serial converter 26a whereupon these commands are coupled to the serial control inputs of the audio/video devices. Commands entered remotely at wireless keyboard/mouse touchpad 8 are transmitted to antenna 28a where they are received and converted into serial signals by RF/serial converter 28. The serial signals are then converted into parallel by serial-to-parallel converter 26b and coupled through PC bus 16 to wireless computer 2.

In operation, the PC board of FIG. 3 controls the communications between the wireless computer 2, the wired audio/video devices and the wireless audio/video devices.

The user stationed at wireless computer 2 enters commands locally on keyboard/mouse 4 to control the wired audio/video devices. Alternatively, the user may enter commands to remotely control the wired audio/video devices by operation of wireless keyboard/mouse touchpad 8 from anywhere in the home. The wireless control signals are transmitted to antenna 28a, converted by RF/serial converter 28, and converted by serial-to-parallel converter 26b. Whereupon, the commands are bussed by PC bus 16 to the processor of wireless computer 2.

The commands for controlling the wired audio/video devices which are coupled to wireless computer 2 through PC bus 16 are processed into control signals, converted by parallel-to-serial converter 26a and output to the serial control inputs of the wired audio/video devices. In this manner, the user enters commands to control the wired audio/video devices from either the local area of wireless computer 2 using keyboard/mouse 4 or from anywhere in the home using wireless keyboard/mouse touchpad 8.

The commands for controlling the wireless audio/video devices are entered in a similar manner using either keyboard/mouse 4 or wireless keyboard/mouse touchpad 8. In response to audio commands, wireless computer 2 switches switch 18*a* among 1 to n inputs to select between the audio signals including PC audio, audio from the wired audio/video devices (DVD, CD, PC, tuner) and audio signals from am/fm/TV/DSS tuner 24. Similarly, in response to video commands, wireless computer 2 switches switch 18*b* among 1 to n inputs to select between video signals from the wired video devices (DVD, VCR, PC, tuner), am/fm/TV/DSS tuner 24 and the VGA card of the wireless computer. The audio/video signals selected by switches 18*a* and 18*b* in this manner are coupled to audio/video RF transmitter 20 which converts the audio/video signals to RF signals for transmission to the wireless devices via antenna 20*a*. In this manner, the wireless audio/video devices are controlled from anywhere in the home.

Figure 4:
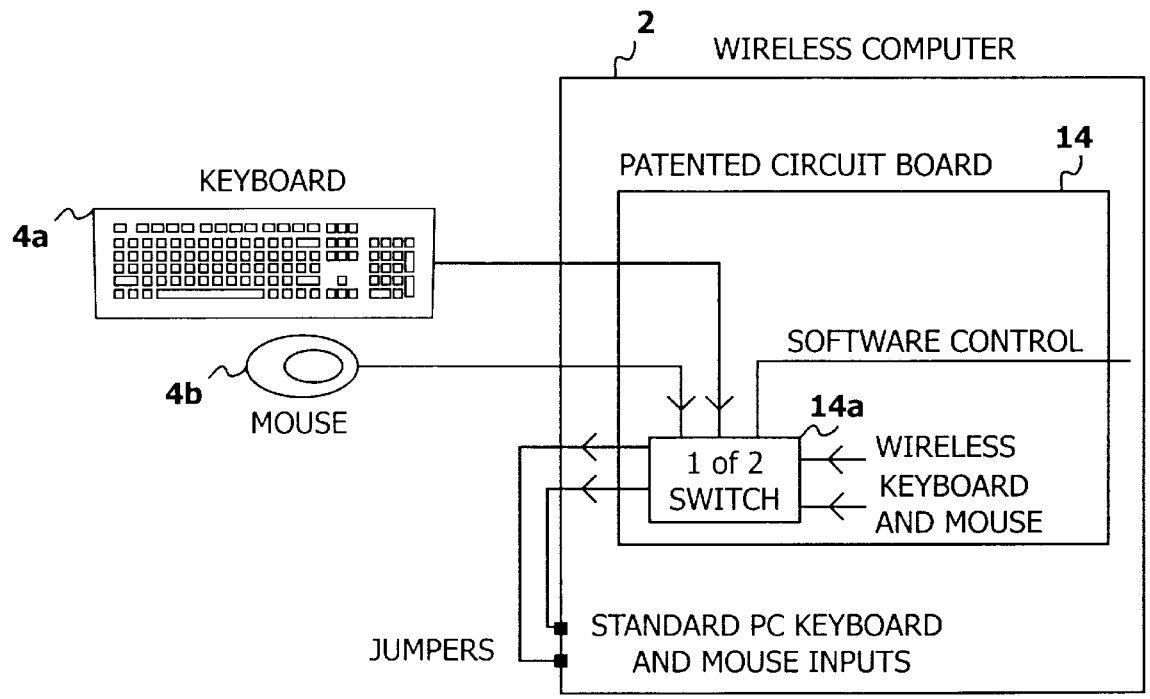
FIG. 4 is a detailed illustration of the first embodiment shown in FIG. 3 of the present invention.

In a variation of this embodiment, the PC board in FIG. 4 is controlled by software to switch between commands from either the wired keyboard/mouse 4 or the wireless keyboard/touchpad mouse 8. More particularly, switch 14*a* is controlled by a signal generated by the software to couple either the wired or wireless user commands through jumpers to standard PC keyboard/mouse inputs. When a wireless command is received, for example, software causes wireless computer 2 to trigger switch 14*a* to couple the wireless commands through the jumpers to the standard PC keyboard and mouse inputs. On the other hand, when commands are entered from the physically-connected keyboard/mouse 4, the software causes wireless computer 2 to configure switch 14*a* to couple such commands through the jumpers to the standard PC keyboard and mouse inputs.

Preferably, the software which controls switch 14*a* is written using a TSR language (a programming language which runs in the background of the operating system) which monitors the wireless keyboard and wireless mouse for user input. However, it will be appreciated that any programming language is applicable to the present invention. Of course, the software for switching switch 14*a* can be programmed into ROM, BIOS (Basic Input/Output System), etc.

Figure 5A:
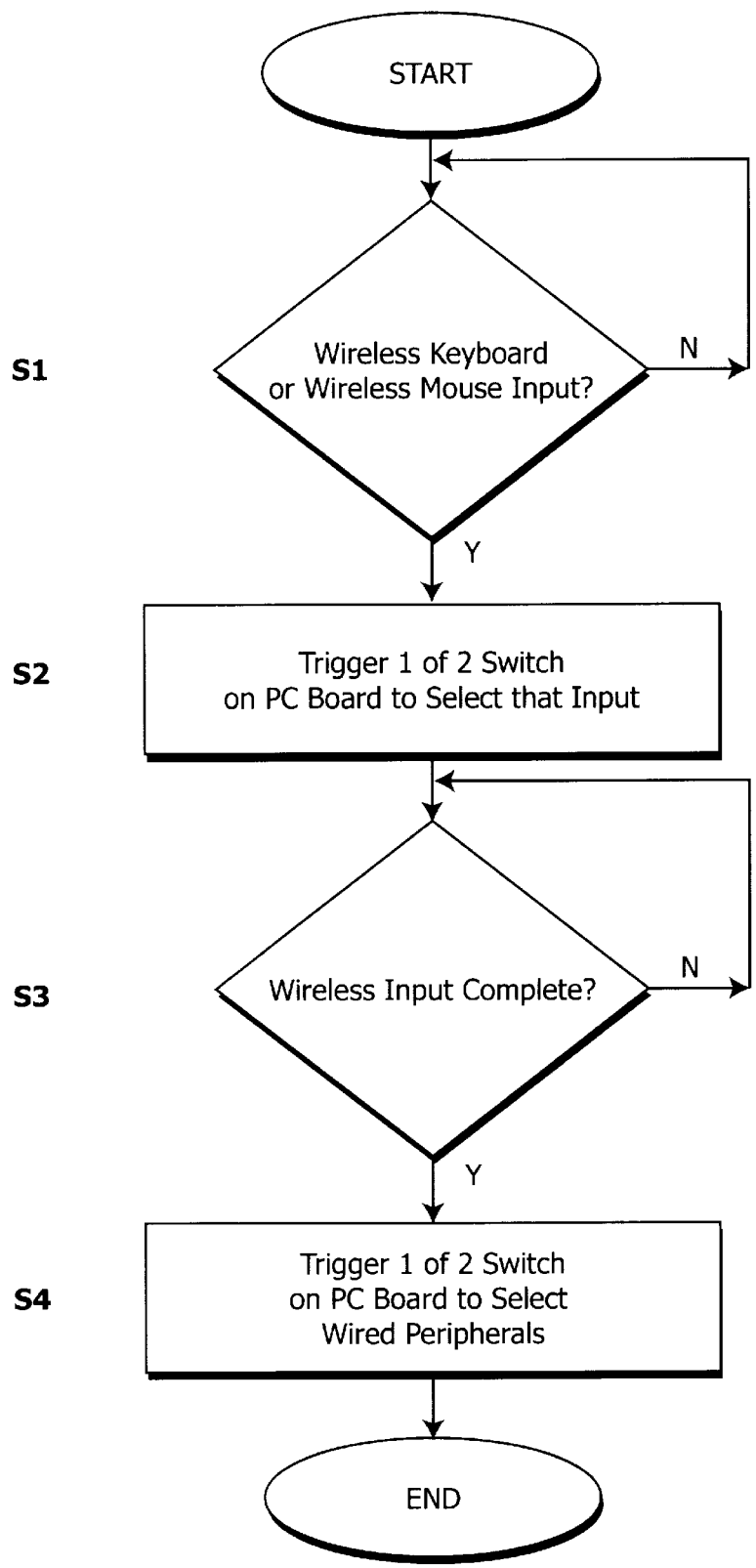
FIGS. 5A and 5B are flow charts for controlling the operation of the present invention.

The flow chart of FIG. 5A illustrates the operation of the software which controls switch 14*a* of FIG. 4 wherein wireless computer 2 determines in step S1 that the user enters a wireless command at wireless keyboard/touchpad mouse 8. Whereupon, control advances to step S2 and wireless computer 2 causes switch 14*a* on the PC board to select the wireless input. At this time, wireless commands from the wireless keyboard/touch pad mouse 8 are coupled through the jumpers to the standard PC keyboard/mouse inputs. In step S3, wireless computer 2 waits until the wireless input is complete and, in step S4, causes switch 14*a* on the PC board to select the wired keyboard and mouse signals. Otherwise, if it is determined in step S1 that no wireless commands have been entered, switch 14*a* couples the wired commands through the jumpers to the standard PC keyboard/mouse inputs.

Figure 5B:
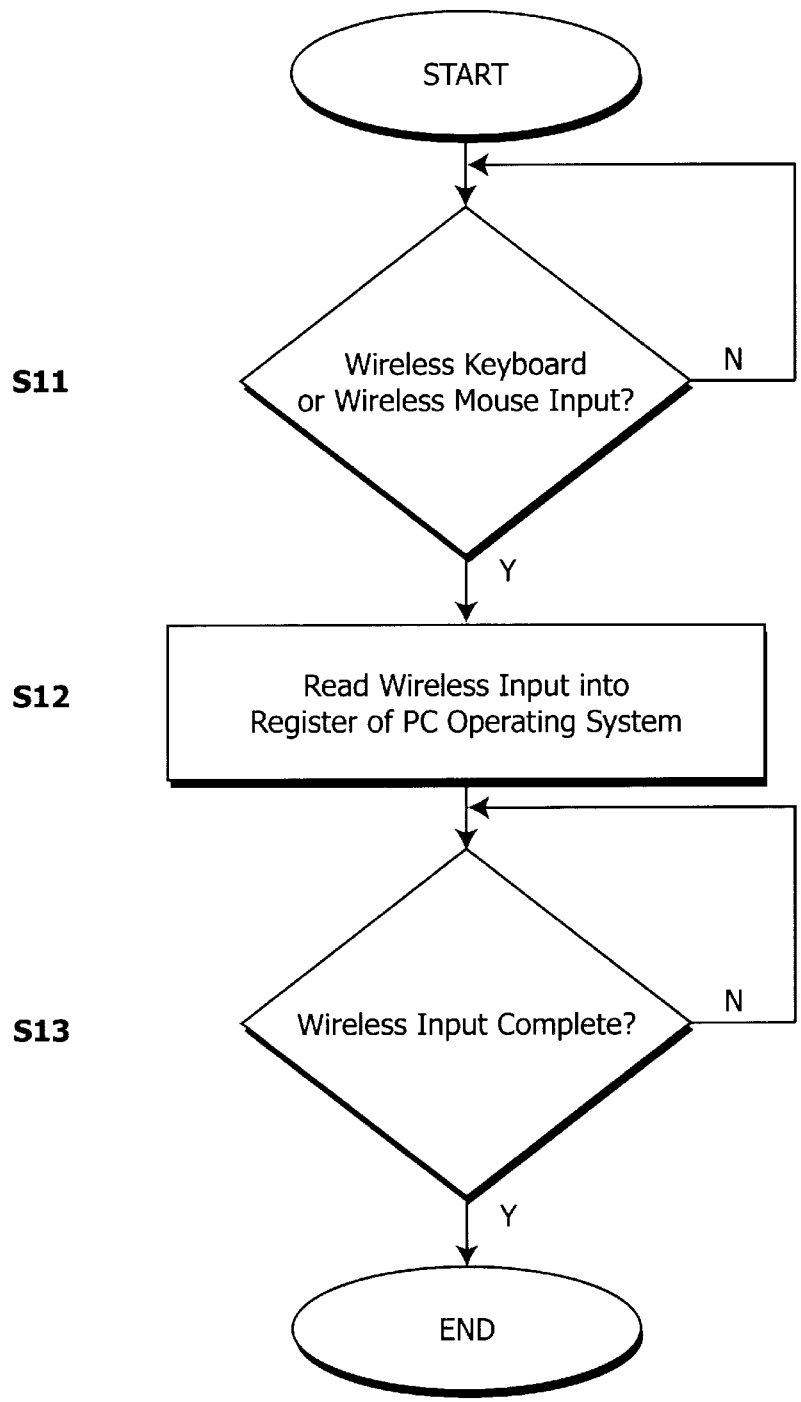

In a software-only solution, the wireless commands are read directly into a register of the PC operating system. According to the flow chart of FIG. 5B, wireless computer 2 determines in step S11 whether wireless keyboard/touchpad mouse 8 generates a wireless command. If so, control advances to step S12 wherein wireless computer 2 reads the wireless commands directly into the register of the PC operating system. In other words, the operating system is "fooled" that the wireless keyboard/mouse touchpad signals are generated by the physically-connected keyboard and mouse. In step S13, it is determined when wireless input is complete. In this manner, wireless keyboard/mouse touchpad signals are read directly into the register of the PC operating system.

Figure 6:
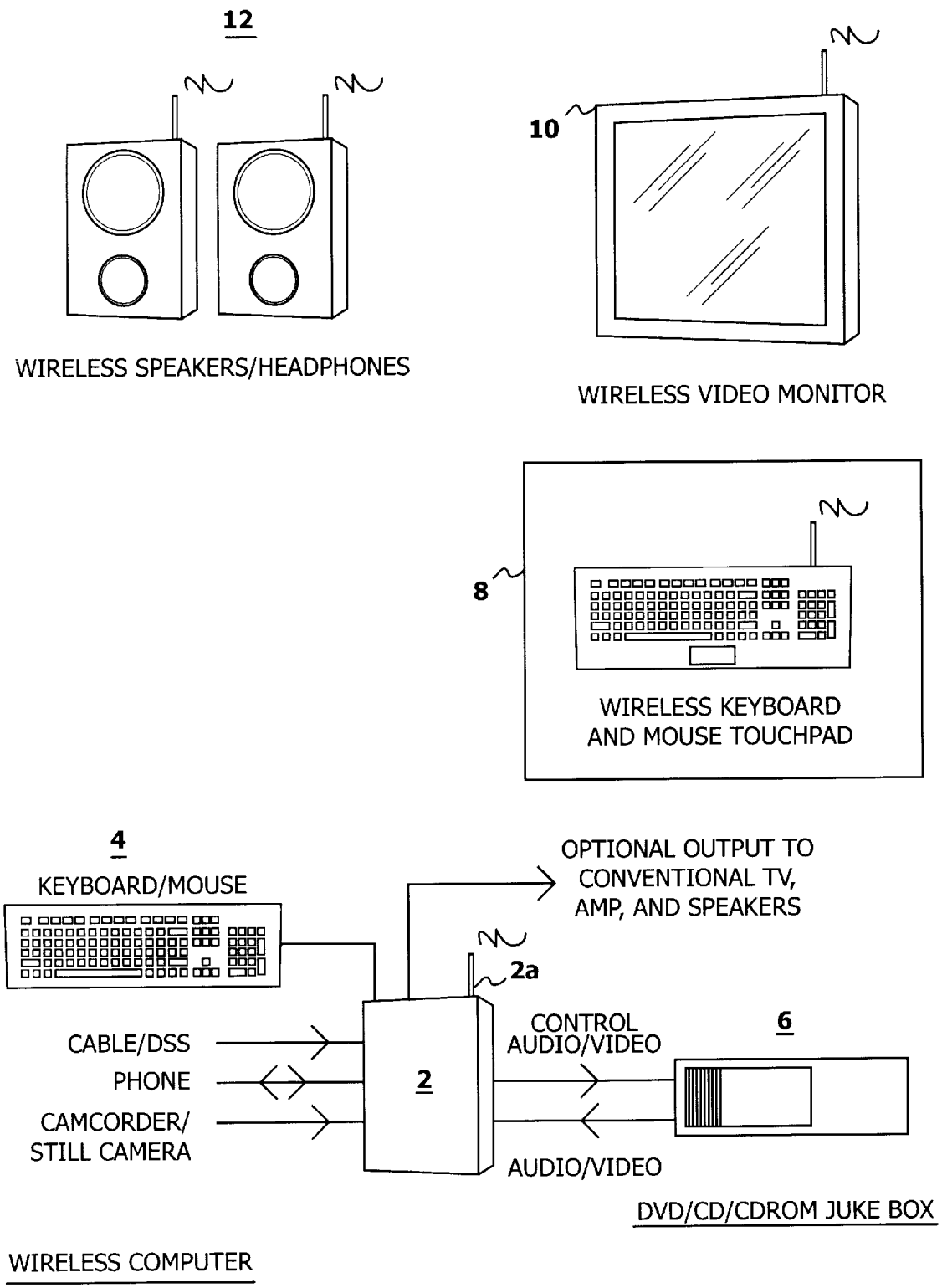
FIG. 6 illustrates the converged system according to a second embodiment of the present invention.

FIG. 6 illustrates the second embodiment of the present invention which provides wireless keyboard/mouse touchpad 8. Wireless computer 2, wired keyboard/mouse 4, DVD carousel/CD player/CD-ROM jukebox 6, wireless video monitor 10 and wireless speakers/headphones 12 are common to both FIGS. 1 and 6 and a discussion of those devices is referred to the foregoing description.

Wireless keyboard/mouse touchpad 8 provides a human interface through which the user's wireless commands are transmitted to wireless computer 2. The entered commands are transmitted to wireless video monitor 10 for display so that the user may visually confirm the commands. In addition, the wireless keyboard/mouse touchpad may include a speaker (not shown) for reproducing audio, including audio feeds downloaded from the internet or computer-generated sounds which indicate operating system procedures.

The wireless keyboard/mouse touchpad may also include a microphone (not shown) for capturing the user's speech. Preferably, the speech captured by the microphone and transmitted to wireless computer 2 may be coupled to a telephone line such that the user may use the wireless keyboard as a remote telephone.

It will be appreciated that other constructions of the wireless keyboard and touchpad mouse may be implemented. It is considered, for example, that the user may transmit wireless commands using a remote control unit.

Figure 8B:
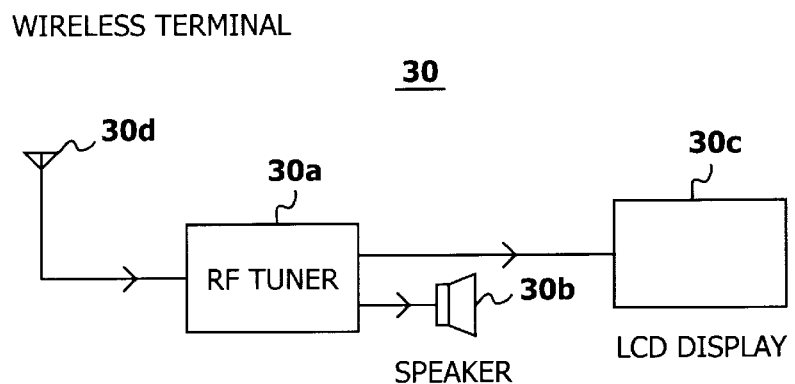
FIGS. 8A and 8B are more detailed illustrations of the second and third embodiments respectively.
Figure 8A:
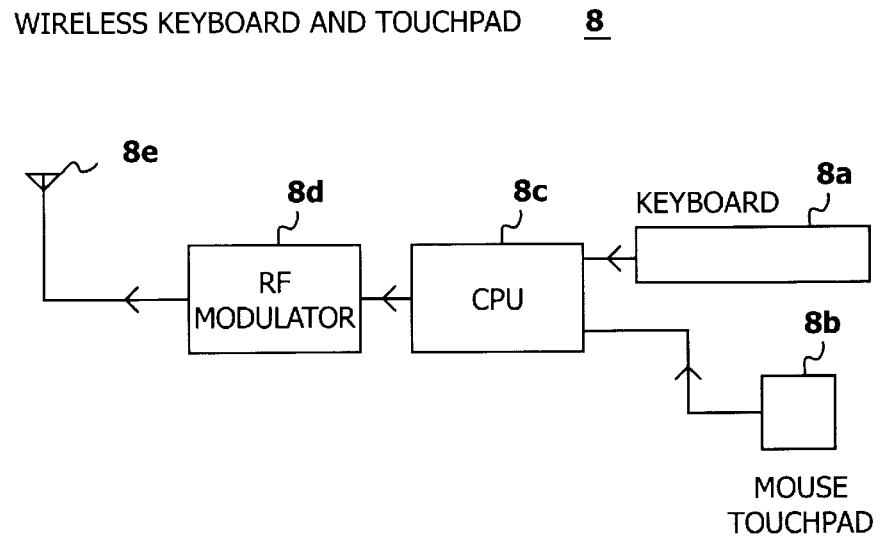

FIG. 8A shows a more detailed construction of wireless keyboard/mouse touchpad 8, wherein keyboard 8A couples keyboard strokes entered thereon by the user to CPU 8*c* and mouse touchpad 8*b* couples signals selected therewith by the user to CPU 8*c*. The keyboard strokes and mouse touchpad signals received by CPU 8*c* are sent to modulator 8*d* which modulates the signals into RF signals for transmission by antenna 8*e*.

In operation, the user enters keyboard strokes on keyboard 8*a* and mouse commands using mouse touchpad 8*b*. The keyboard strokes entered by the user on the keyboard are coded into, for example, ASCII by CPU 8*c*, modulated by RF modulator 8*d* and transmitted by antenna 8*e*. The RF signals are then transmitted by antenna 8*e* to wireless computer 2 for processing and wireless video monitor 10 for display. A position and status of the mouse touchpad 8*b* is determined from the mouse touchpad signals by CPU 8*c*, modulated into RF signals by RF modulator 8*d* and transmitted to both the wireless computer and the wireless video monitor by antenna 8*e*. Wireless monitor 10 displays the position and status of mouse touchpad 8*b* as a blinking cursor (not shown). Wireless computer 2 then controls the audio/video devices based on these signals.

Figure 7:
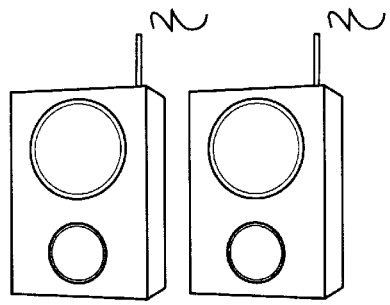
FIG. 7 illustrates the converged system according to a third embodiment of the present invention.
Figure 7:
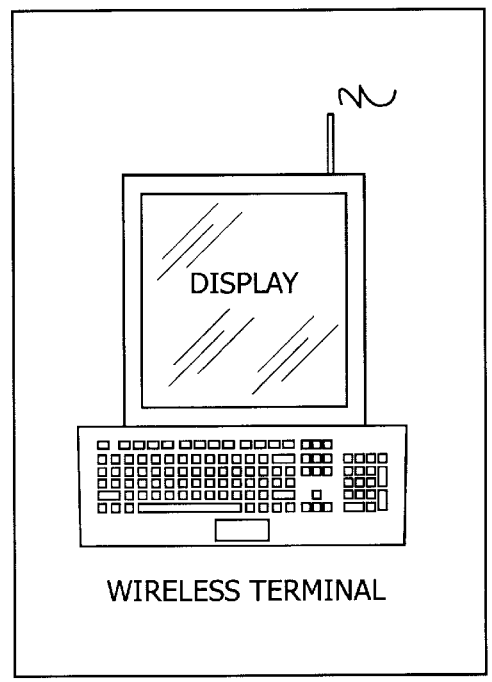
Figure 7:
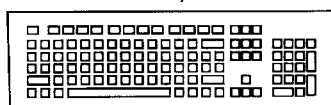
Figure 7:
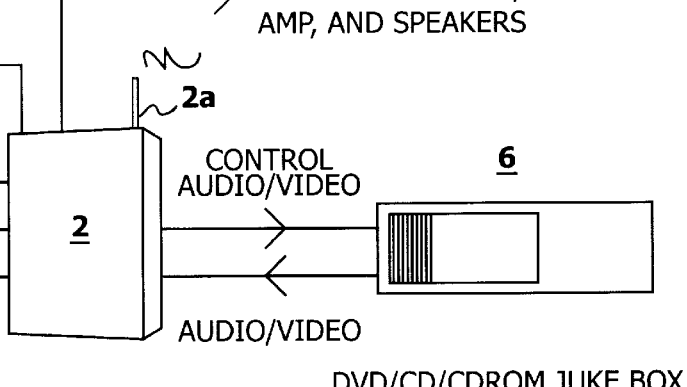

FIG. 7 illustrates the third embodiment of the present invention which provides wireless terminal 30. As shown in the more detailed construction of FIG. 8A, wireless terminal 30 includes keyboard and mouse touchpad 8*a* and 8*b*, CPU 8*c*, RF modulator 8*d* and antenna 8*e* which are discussed in the foregoing description. In addition, wireless terminal 30 includes the display shown in FIG. 8B wherein RF signals transmitted from wireless computer 2 are received by antenna 30*d* and demodulated by RF tuner 30*a*. Audio transmitted to wireless terminal 30 is reproduced by speaker 30*b* while transmitted video is displayed by LCD display 30*c* in accordance with the human interface software. Of course, the display may be another type of display such as a color monitor.

In operation, wireless terminal 30 acts like a "dumb" computer terminal whereby the user enters keyboard strokes on keyboard 8*a* and mouse commands using mouse touchpad 8*b*. The keyboard strokes and mouse commands are converted by CPU 8*c* into digital codes, RF modulated by RF modulator 8*d* and transmitted by antenna 8*e*.

In this embodiment, the user receives audio/video at wireless terminal 30. Wireless computer 2 transmits audio/video to antenna 30*d* of wireless terminal 30 which is then demodulated by RF tuner 30*a*. The audio is reproduced by speaker 30*b* while video is displayed by LCD display 30*c* in accordance with the human interface software.

Thus, the present invention provides a converged system in which the user operates audio/video devices from a wireless keyboard, terminal or remote from anywhere in the home. With this invention, the user is not confined to the local area of the PC, thereby allowing the user to access the internet wherever the user desires. The user needs simply to place the wireless audio/video devices anywhere in the home without expending the time and money to install costly networks.

Although preferred embodiments of the present invention and modifications thereof have been described in detail herein, it is to be understood that this invention is not limited to those precise embodiments and modifications, and that other modifications and variations may be effected by one skilled in the art without departing from the spirit and scope of the invention as defined by the appended claims.

I claim:

1. A converged system architecture for converging a personal computer with audio/video devices, said system comprising:

wireless communication means for transmitting, via a wireless medium, wireless communications between said personal computer and said audio/video devices;

wireless peripheral means for entering, remotely from said personal computer, wireless commands for controlling said audio/video devices, wherein said wireless commands are communicated from said wireless peripheral means to said personal computer by said wireless communication means and said personal computer generates signals for controlling said audio/video devices in accordance with said wireless commands; and coupling means for coupling, in accordance with said signals, said wireless communications to said wireless communication means for wireless transmission to said audio/video devices.

2. The converged system architecture according to claim 1, wherein said coupling means comprises switch means having a plurality of inputs physically coupled to audio/video devices for selectively switching, in accordance with said signals generated by said personal computer, between said plurality of inputs, thereby coupling the selected input to said wireless communication means.

3. The converged system architecture according to claim 2, wherein said coupling means couples said signals generated by said personal computer to an input of an audio/video device.

4. The converged system architecture according to claim 3, wherein said coupling means is a PC board which is coupled to a PC bus of said personal computer.

5. The converged system architecture according to claim 4, wherein said PC board selects between wireless commands from said wireless peripheral means and commands from a peripheral physically coupled to said personal computer, said PC board couples the selected commands to an operating system input of said personal computer.

6. The converged system architecture according to claim 5, wherein said PC board couples said wireless commands from said wireless peripheral means to a register of an operating system of said personal computer.

7. The converged system architecture according to claim 3, wherein said coupling means and said wireless peripheral means comprise a wireless keyboard.

8. The converged system architecture according to claim 3, wherein said coupling means and said wireless peripheral means comprise a wireless terminal.

9. A converged system architecture for converging a personal computer with audio/video devices, said system comprising:

a transmitter/receiver for transmitting/receiving, via a wireless medium, wireless communications between said personal computer and said audio/video devices;

a wireless peripheral for entering, remotely from said personal computer, wireless commands for controlling said audio/video devices, wherein said wireless commands are communicated from said wireless peripheral to said personal computer by said transmitter/receiver and said personal computer generates signals for controlling said audio/video devices in accordance with said wireless commands; and a coupling circuit for coupling, in accordance with said signals, said wireless communications to said transmitter/receiver for wireless transmission to said audio/video devices.

10. The converged system architecture according to claim 9, wherein said coupling circuit comprises a switch having a plurality of inputs physically coupled to audio/video devices for selectively switching, in accordance with said signals generated by said personal computer, between said plurality of inputs, thereby coupling the selected input to said transmitter/receiver.

11. The converged system architecture according to claim 10, wherein said coupling circuit couples said signals generated by said personal computer to an input of an audio/video device.

12. The converged system architecture according to claim 11, wherein said coupling circuit is a PC board which is coupled to a PC bus of said personal computer.

13. The converged system architecture according to claim 12, wherein said PC board selects between wireless commands from said wireless peripheral and commands from a peripheral physically coupled to said personal computer, said PC board couples the selected commands to an operating system input of said personal computer.

14. The converged system architecture according to claim 13, wherein said PC board couples said wireless commands from said wireless peripheral to a register of an operating system of said personal computer.

15. The converged system architecture according to claim 11, wherein said coupling circuit and said wireless peripheral comprise a wireless keyboard.

16. The converged system architecture according to claim 11, wherein said coupling circuit and said wireless peripheral comprise a wireless terminal.

17. A method for converging a personal computer with audio/video devices, said system comprising the steps of:

providing a wireless peripheral where wireless commands for controlling said audio/video devices are entered remotely;

transmitting, via a wireless medium, said wireless commands to said personal computer;

generating signals in said personal computer corresponding to said wireless commands; and controlling wireless communications between said personal computer and said audio/video devices in accordance with said signals.

18. The method according to claim 17, further comprising the steps of:

switching, in accordance with said signals generated by said personal computer, between a plurality of inputs physically coupled to audio/video information generated by respective audio/video devices; and transmitting, via a wireless medium, the selected audio/video information to a wireless audio/video device.

19. The method according to claim 18, further comprising the step of coupling said signals to physically connected audio/video devices.

20. The method according to claim 18, wherein said step of switching configures a switch on a PC board which is coupled to a PC bus of said personal computer.

21. The method according to claim 20, wherein said step of switching couples the selected commands to an operating system input of said personal computer.

22. The method according to claim 20, wherein said step of switching couples said wireless commands to a register of an operating system of said personal computer.

23. The method according to claim 19, wherein said step of providing provides a wireless keyboard.

24. The method according to claim 19, wherein said step of providing provides a wireless terminal.

* * * * *